US009589581B2

(12) United States Patent
Takagishi et al.

(10) Patent No.: US 9,589,581 B2
(45) Date of Patent: Mar. 7, 2017

(54) MICROWAVE-ASSISTED MAGNETIC RECORDING HEAD AND MAGNETIC RECORDING APPARATUS INCLUDING THE SAME

(71) Applicant: KABUSHIKI KAISHA TOSHIBA, Tokyo (JP)

(72) Inventors: Masayuki Takagishi, Tokyo (JP); Hitoshi Iwasaki, Tokyo (JP); Kenichiro Yamada, Tokyo (JP)

(73) Assignee: Kabushiki Kaisha Toshiba, Kyoto (JP)

( * ) Notice: Subject to any disclaimer, the term of this patent is extended or adjusted under 35 U.S.C. 154(b) by 0 days.

(21) Appl. No.: 14/971,482

(22) Filed: Dec. 16, 2015

(65) Prior Publication Data

US 2016/0180867 A1    Jun. 23, 2016

(30) Foreign Application Priority Data

Dec. 18, 2014   (JP) .................................. 2014-256498

(51) Int. Cl.
*G11B 5/00* (2006.01)
*G11B 5/09* (2006.01)
*G11B 5/31* (2006.01)

(52) U.S. Cl.
CPC ................. *G11B 5/00* (2013.01); *G11B 5/09* (2013.01); *G11B 5/314* (2013.01); *G11B 2005/0024* (2013.01)

(58) Field of Classification Search
CPC .......................... G11B 2005/0021–2005/0024
See application file for complete search history.

(56) References Cited

U.S. PATENT DOCUMENTS 7,957,098 B2    6/2011  Yamada et al.
8,320,079 B2 *  11/2012 Iwasaki .................. B82Y 10/00
                                          360/125.3

(Continued)

FOREIGN PATENT DOCUMENTS

JP    2009-064499    3/2009
JP    2009-070541    4/2009

(Continued)

OTHER PUBLICATIONS

Zhu et al., "Microwave Assisted Magnetic Recording Utilizing Perpendicular Spin Torque Oscillator with Switchable Perpendicular Electrodes", IEEE Transactions on Magnetics, vol. 46, No. 3, Mar. 2010, pp. 751-757.

(Continued)

*Primary Examiner* — Wayne Young
*Assistant Examiner* — James L Habermehl
(74) *Attorney, Agent, or Firm* — Nixon & Vanderhye P.C.

(57) ABSTRACT

A microwave-assisted magnetic recording head according to an embodiment includes: a magnetic pole; a magnetic shield including a first portion and a second portion connecting to the first portion, a gap being present between the first portion and the magnetic pole; a recording coil disposed to at least one of the magnetic pole and the magnetic shield; and a spin torque oscillator including a nonmagnetic intermediate layer extending within and outside the gap, an oscillation layer disposed on a portion of the nonmagnetic intermediate layer in the gap, and a spin injection layer in which a magnetization direction is pinned and which is disposed on a portion of the nonmagnetic intermediate layer outside the gap so as to be separated from the oscillation layer.

18 Claims, 17 Drawing Sheets

(56) References Cited

U.S. PATENT DOCUMENTS

| | | | | |
|---|---|---|---|---|
| 8,400,734 B2* | 3/2013 | Yamada | ............ | G01S 19/30 |
| | | | | 360/125.3 |
| 8,472,140 B2* | 6/2013 | Yamada | ............ | B82Y 25/00 |
| | | | | 360/125.3 |
| 8,564,904 B2* | 10/2013 | Iwasaki | ............ | G01R 33/093 |
| | | | | 360/125.3 |
| 8,755,153 B2* | 6/2014 | Kudo | ............ | G11B 5/3903 |
| | | | | 360/321 |
| 9,047,887 B2* | 6/2015 | Funayama | ............ | G11B 5/23 |
| 9,117,465 B2 | 8/2015 | Kamiguchi et al. | | |
| 9,142,228 B2* | 9/2015 | Fujita | ............ | G11B 5/23 |
| 2009/0059417 A1 | 3/2009 | Takeo et al. | | |
| 2010/0073806 A1* | 3/2010 | Koui | ............ | G11B 5/02 |
| | | | | 360/75 |
| 2014/0036387 A1 | 2/2014 | Sato et al. | | |
| 2014/0118861 A1 | 5/2014 | Funayama | | |
| 2014/0204487 A1 | 7/2014 | Hase et al. | | |

FOREIGN PATENT DOCUMENTS

| | | |
|---|---|---|
| JP | 2014-086122 | 5/2014 |
| JP | 2014-139852 | 7/2014 |
| JP | 2014-149911 | 8/2014 |
| JP | 2015-026741 | 2/2015 |
| JP | 2016-007192 | 1/2016 |

OTHER PUBLICATIONS

Furubayashi et al., DQ-04, "Current-Perpendicular-to-Plane Giant Magnetoresistance Using a Heusler Alloy for Ferromagnetic Layers and B2-ordered CuZu for a Spacer Layer," 59th MMM Conference Digest (2014) (Abstract).

* cited by examiner

| | Hr | CONVENTIONAL RECORDING | | | RECORDING ACCORDING TO FIRST EMBODIMENT | | |
|---|---|---|---|---|---|---|---|
| | | MAGNETIZATION OF SPIN INJECTION LAYER | DRIVE CURRENT OF SPIN TORQUE OSCILLATOR | Hac | MAGNETIZATION OF SPIN INJECTION LAYER | DRIVE CURRENT OF SPIN TORQUE OSCILLATOR | Hac |
| POSITIVE RECORDING COIL CURRENT | DOWNWARD | RIGHT | POSITIVE AND FIXED | ANTICLOCKWISE | RIGHT AND FIXED | POSITIVE | ANTICLOCKWISE |
| NEGATIVE RECORDING COIL CURRENT | UPWARD | LEFT | POSITIVE AND FIXED | CLOCKWISE | RIGHT AND FIXED | NEGATIVE | CLOCKWISE |

FIG. 16

MICROWAVE-ASSISTED MAGNETIC RECORDING HEAD AND MAGNETIC RECORDING APPARATUS INCLUDING THE SAME

CROSS REFERENCE TO RELATED APPLICATIONS

This application is based upon and claims the benefit of priority from prior Japanese Patent Application No. 2014-256498 filed on Dec. 18, 2014 in Japan, the entire contents of which are incorporated herein by reference.

FIELD

Embodiments described herein relate generally to microwave-assisted magnetic recording heads and magnetic recording apparatuses including the same.

BACKGROUND

A magnetic recording apparatus, for example a magnetic disk apparatus, includes a magnetic disk housed in a casing, a spindle motor that supports and rotates the magnetic disk, a magnetic head that writes data to and reads data from the magnetic disk, and a carriage assembly that supports the magnetic head so as to be movable relative to the magnetic disk. The magnetic head includes a slider attached to a suspension, and a head portion disposed to the slider, which has a recording head for writing and a reproducing head for reading.

Magnetic heads for perpendicular magnetic recording have been proposed to improve the recording density and the capacity, and to decrease the size of magnetic disk apparatuses. Furthermore, microwave-assisted recording heads are proposed, in which a spin torque oscillator generating high-frequency waves is disposed near a main magnetic pole to apply a high-frequency magnetic field to a recording medium.

A microwave-assisted magnetic recording apparatus needs to improve the track recording density in addition to the improvement of the recording magnetic field, and for this purpose needs a steep gradient magnetic field.

A conventional microwave-assisted magnetic heads performs recording in the following manner. The magnetic field generated by the main magnetic pole is divided into a component in the recording gap between the main magnetic pole and the trailing shield and a component on the recording medium side. If the direction of a current flowing through the recording coil is reversed, the magnetic field of the component in the recording gap is reversed in accordance with the reversal of the recording magnetic field Hr applied to the recording medium. This leads to the reversal of the magnetization of the spin injection layer in the spin torque oscillator disposed in the recording gap. As a result, the rotating direction of the high-frequency magnetic field Hac generated by the spin torque oscillator is reversed. The high-frequency magnetic field Hac rotating in a different direction in accordance with the reversal of the polarity of the recording magnetic field Hr, which is the basic principle of the assistance effect, can be obtained in this manner.

In order to achieve a steep gradient in the recording magnetic field Hr, a narrow recording gap is needed. The thickness of the spin torque oscillator disposed in the recording gap should be reduced for this purpose. However, in order to improve the intensity of the high-frequency magnetic field Hac (to improve the recording capacity), the thickness of the oscillation layer of the spin torque oscillator should be increased as much as possible. Therefore, in order to reduce the thickness of the spin torque oscillator, the thickness of the spin injection layer is preferably reduced. Spin torque oscillators in which an oscillation layer is disposed on the top of the air-bearing surface (ABS) and the spin injection layer is moved back from the ABS are proposed, as is known in the art. The area between the main magnetic pole and the trailing shield in the recording gap of the proposed spin torque oscillator is wider than that of conventional spin torque oscillators since the magnetic field in the recording gap is applied to the portion from which the spin injection layer is moved back from the ABS. This causes a problem in which the magnetic field generated by the main magnetic pole rather than the recording magnetic field Hr flows into the recording gap more easily. As a result, the recording magnetic field Hr may be reduced.

BRIEF DESCRIPTION OF THE DRAWINGS

FIG. 16 is a diagram showing differences in the direction of the magnetization in the spin injection layer and the direction in drive current of the spin torque oscillator between conventional microwave-assisted recording and the microwave-assisted recording according to the first embodiment.

DETAILED DESCRIPTION

A microwave-assisted magnetic recording head according to an embodiment includes: a magnetic pole; a magnetic shield including a first portion and a second portion connecting to the first portion, a gap being present between the first portion and the magnetic pole; a recording coil disposed to at least one of the magnetic pole and the magnetic shield; and a spin torque oscillator including a nonmagnetic intermediate layer extending within and outside the gap, an oscillation layer disposed on a portion of the nonmagnetic intermediate layer in the gap, and a spin injection layer in which a magnetization direction is pinned and which is disposed on a portion of the nonmagnetic intermediate layer outside the gap so as to be separated from the oscillation layer.

Embodiments will now be explained with reference to the accompanying drawings.

First Embodiment

Figure 1:
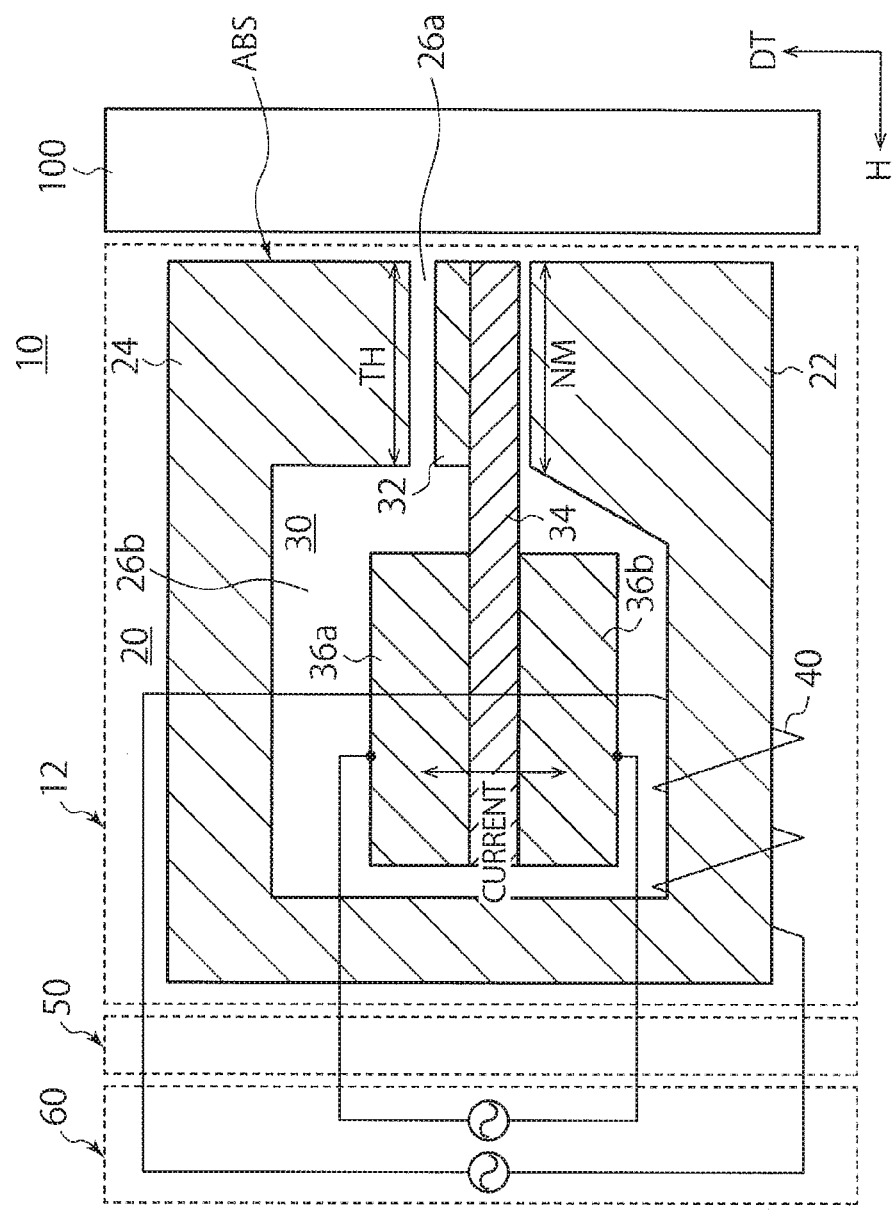
FIG. 1 is a diagram showing a magnetic recording head according to a first embodiment.

FIG. 1 shows a magnetic recording head according to a first embodiment. The magnetic recording head 10 includes a slider 12 in a substantially rectangular shape attached to a suspension 50 of a gimbal assembly, and a head portion 20 provided on the slider 12. The head portion 20 includes a main magnetic pole 22, a trailing shield 24, a spin torque oscillator 30, and a recording coil 40 wound around the main magnetic pole 22.

The main magnetic pole 22 and the trailing shield 24 form a magnetic path or magnetic flux path within the magnetic material, and are separated from each other to provide a gap 26a serving as a recording gap near the ABS facing a magnetic recording medium 100. There is no other nonmagnetic portion that cuts the magnetic path. A magnetic field is generated in the gap 26a since the magnetic path is cut therein. A material with a sufficiently high magnetic permeability such as a FeCo alloy is used to form the magnetic path. Accordingly, the magnetic flux flowing through the magnetic path does not go outside, and no magnetic field is generated except for the gap 26a.

The spin torque oscillator 30 includes an oscillation layer 32 disposed within the gap 26a and generating a high-frequency magnetic field, an intermediate layer 34 of a nonmagnetic material (for example Cu) connecting to the oscillation layer 32 and extending toward the backside away from the ABS side, and spin injection layers 36a, 36b connecting to the intermediate layer 34 and disposed outside the gap 26a to be separated from the oscillation layer 32, the magnetization direction of each of the spin injection layers 36a, 36b being fixed. This structure does not apply the magnetic field from the magnetic path to the spin injection layers, unlike conventional microwave-assisted recording heads. Accordingly, the magnetization directions of the spin injection layers 36a, 36b are pinned in a certain direction even during a recording operation. The spin injection layers 36a, 36b are disposed on opposite sides of the intermediate layer 34. Specifically, the spin injection layer 36a is disposed on the trailing shield 24 side of the intermediate layer 34, and the spin injection layer 36b is disposed on the main magnetic pole 22 side of the intermediate layer 34. Although the oscillation layer 32 is disposed on the same side as the spin injection layer 36a on the intermediate layer 34 in FIG. 1, it may be disposed on the same side as the spin injection layer 36b on the intermediate layer 34. A drive current is caused to flow between the spin injection layer 36a and the spin injection layer 36b via the intermediate layer 34 by a current drive and control circuit 60 included in a magnetic recording apparatus that is not shown in FIG. 1.

A current in a first direction or a current in a second direction that is opposite to the first direction is caused to flow through the recording coil 40 by the current drive and control circuit 60. The current flowing through the recording coil 40 generates a recording magnetic field Hr near the recording gap 26a of the magnetic path. The recording magnetic field Hr is applied to the magnetic recording medium 100. The direction of magnetization recorded in the magnetic recording medium 100 may be defined to be in an upward direction or a downward direction relative to the surface of the magnetic recording medium 100 by switching the direction of the current flowing through the recording coil 40 by means of the current drive and control circuit 60. In FIG. 1, DT (Down Track) indicates the moving direction of the magnetic recording medium 100, and H (Height) indicates the direction that is perpendicular to the surface of the magnetic recording medium 100. The drive current that drives the spin torque oscillator 30 is preferably caused to be in sync with the current flowing through the recording coil by means of the current drive and control circuit 60, as will be described later.

The recording gap between the main magnetic pole 22 and the trailing shield 24 is preferably narrowed near the ABS. This may help to generate a steep gradient recording magnetic field Hr to improve the track recording density.

The leakage of the recording magnetic field Hr in the recording gap 26a may be prevented by reducing the length NH (neck height) of the main magnetic pole 22 from the ABS and the length TH (throat height) of the trailing shield 24 from the ABS in the recording gap 26a. The recording magnetic field Hr applied to the magnetic recording medium 100 may be maintained in this manner. From this viewpoint, the length TH and the length NH are preferably as short as possible. In the currently-available leading-edge recording heads, the lengths NH, TH are between 50 to 100 nm. It is preferable that the lengths NH, TH be further reduced as the recording density is improved.

Furthermore, it is desired that no nonmagnetic region other than the recording gap is present, and the entire magnetic path is formed of a ferromagnetic material in order to perform high-transfer-rate recording and high-speed switching of the recording magnetic field Hr.

A large recording magnetic field may be generated by the main magnetic pole 22 and the trailing shield 24 near the recording gap 26a. For this reason, a FeCo-based alloy with a large saturation magnetic field is preferably used to from the main magnetic pole 22 and the trailing shield 24.

Conventional microwave-assisted recording heads use the main magnetic pole and the trailing shield as electrodes of the spin torque oscillator in order to have a narrow gap. In this case, a nonmagnetic insulating portion for electrically disconnecting the main magnetic pole and the trailing shield from each other is provided to each recording head. In contrast, no current flows through the magnetic path formed of the main magnetic pole 22 and the trailing shield 24 in this embodiment. Accordingly, the entire magnetic path except for the gap portion can be formed of a ferromagnetic material. This enables high-transfer-rate recording.

The spin torque oscillator 30 will be described in more detail below.

The spin injection layers 36a, 36b are preferably formed of a material that has a large spin polarization, and is likely to be magnetized in a direction perpendicular to the film plane using the perpendicular magnetic anisotropy. A multilayer film formed by alternately stacking layers of Co and layers of X that is at least one element selected from the group consisting of Ni, Pd, Pt, Fe, a FePt alloy, and a CoPt alloy may be used to form the spin injection layers 36a, 36b.

A high polarizability layer may be disposed between each of the spin injection layers 36a, 36b and the intermediate layer 34 in order to improve the spin polarization. The high polarizability layer may be formed of a FeCo alloy or a Heusler alloy such as CoFeMnSi.

The spin injection layers 36a, 36b are in contact with the intermediate layer 34, and are separately disposed on two regions of the intermediate layer 34. The amount of spin injected to the intermediate layer 34 may be doubled by causing a current to flow between the two spin injection layers 36a, 36b via the intermediate layer 34 as compared to the case where a current is caused to flow through the intermediate layer 34 by means of one spin injection layer and one nonmagnetic electrode. This has an advantage in that the oscillation layer 32 may oscillate more easily. The magnetizations of the two spin injection layers 36a, 36b are pinned in opposite directions near the portions in contact with the intermediate layer 34. If the magnetizations are pinned to be in the same direction, the injected spin currents in the respective layers are mutually cancelled. This makes the oscillation of the oscillation layer 32 difficult.

The two spin injection layers 36a, 36b may be caused to have magnetizations in opposite directions in the following two manners.

Figure 2:
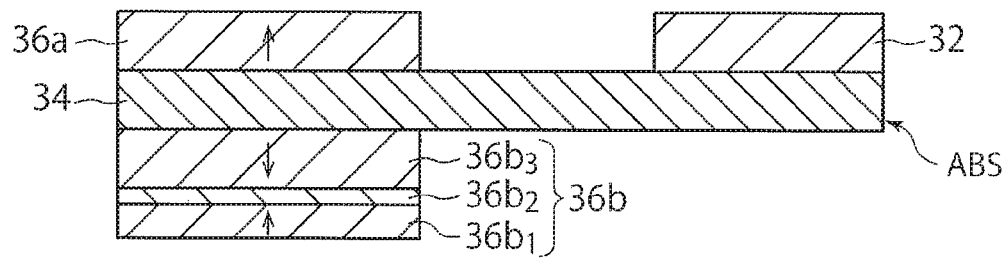
FIG. 2 is a cross-sectional view showing a first example of a spin torque oscillator used in the first embodiment.

In the first example, a common one-direction perpendicular magnetization layer is used as the spin injection layer 36a while a multilayer structure including a perpendicular magnetization layer $36b_1$, an antiferromagnetic coupling layer $36b_2$, and a perpendicular magnetization layer $36b_3$ is used as the spin injection layer 36b as shown in FIG. 2. The antiferromagnetic coupling layer $36b_2$ has a function of stabilizing the magnetizations of the magnetization layers $36b_1$, $36b_3$ disposed on and below it to be in the opposite directions, and is, for example, a Ru layer having a thickness of 0.4 to 1 nm.

The magnetic thickness (the product of the saturation magnetization and the thickness) of the perpendicular magnetization layer $36b_3$ on the intermediate layer 34 side is set to be thinner than that of the perpendicular magnetization layer $36b_1$ on the opposite side. If a magnetic field to saturate the perpendicular magnetization layer is applied in the direction perpendicular to the film plane, the perpendicular magnetization layer $36b_1$ and the spin injection layer 36a are magnetized in this direction, and the perpendicular magnetization layer $36b_3$ is magnetized in the opposite direction due to the influence of the antiferromagnetic coupling layer $36b_2$.

As a result, the layers are magnetized in the directions indicated by the arrows.

Figure 3:
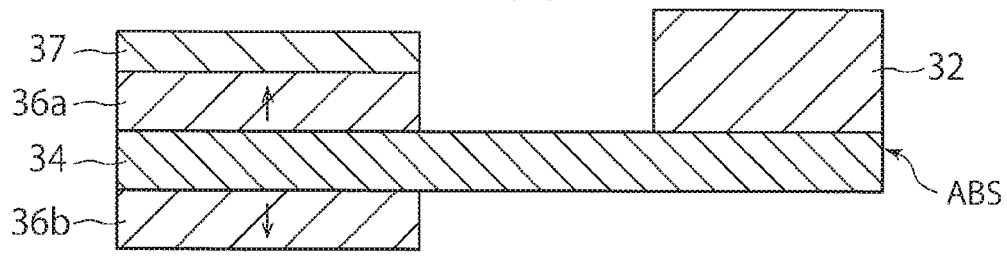
FIG. 3 is a cross-sectional view of a second example of the spin torque oscillator used in the first embodiment.

In the second example, an antiferromagnetic layer 37, for example a IrMn layer 37, is stacked on one of the two spin injection layers 36a, 36b, for example the spin injection layer 36a, as shown in FIG. 3. A heat treatment is performed to the antiferromagnetic layer 37 at a temperature more than the blocking temperature of the antiferromagnetic layer 37 and within a perpendicular magnetic field to apply a one directionally biased magnetic field in the direction perpendicular to the spin injection layer 36a. Thereafter, a magnetization to saturate the perpendicular magnetization layer 36b is applied in the direction perpendicular to the film plane at a room temperature to magnetize the spin injection layer 36b. The magnetization of the perpendicular magnetization layer 36a on which the antiferromagnetic layer 37 is stacked is stabilized in the direction opposite to the direction of the magnetization of the spin injection layer 36b by adjusting the room-temperature coercive force of the perpendicular magnetization layer 36a to be lower than the biased magnetic field from the antiferromagnetic layer 37.

Figure 4:
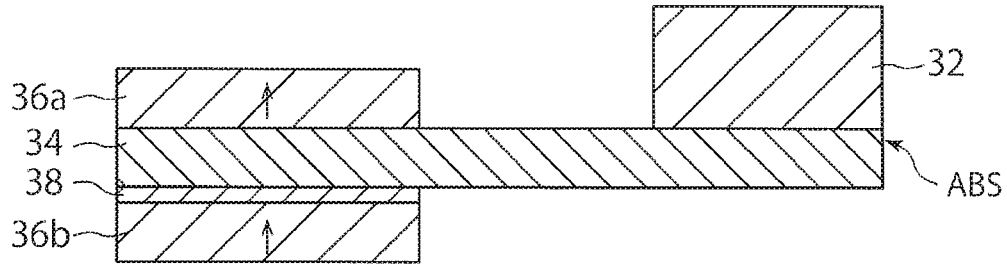
FIG. 4 is a cross-sectional view of a third example of the spin torque oscillator used in the first embodiment.

As has already been described, it is difficult to inject spin into the intermediate layer 34 from two spin injection layers with the same magnetization direction since the sign of the spin current is reversed between the electron input side and the electron output side, which leads to the cancellation of the spins in the respective spin currents. However, even if the two spin injection layers have the same magnetization direction, the sign of the injected spin on the electron input side may be caused to be the same as that of the electron output side by disposing a negative spin torque generating layer 38 containing a material having a negative spin torque such as an FeCr alloy between one of the spin injection layers (for example the spin injection layer 36b) and the intermediate layer 34, as shown in FIG. 4. The spin injection efficiency of the two spin injection layers 36a, 36b is improved in this manner.

As described above, the microwave-assisted magnetic head according to the first embodiment is suitable for generating a steep gradient magnetic field and improving the track recording density.

(First Modification)

A magnetic recording head according to a first modification of the first embodiment will be described with reference to FIG. 5. The magnetic recording head 10 according to the first modification is obtained by replacing the spin torque oscillator 30 of the magnetic recording head 10 according to the first embodiment shown in FIG. 1 with a spin torque oscillator 30 shown in FIG. 5.

Figure 5:
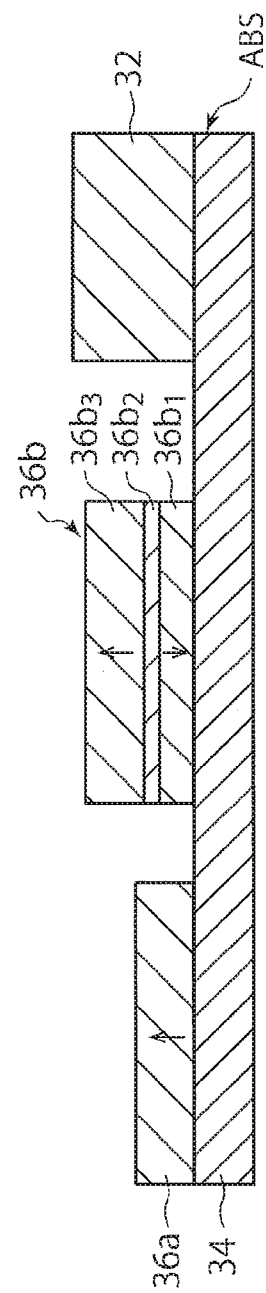
FIG. 5 is a cross-sectional view of a first example of a spin torque oscillator used in a magnetic recording head according to a first modification of the first embodiment.

In the spin torque oscillator 30 shown in FIG. 5, all of the oscillation layer 32 and the spin injection layers 36a, 36b are disposed on one surface of the intermediate layer 34. Furthermore, the spin injection layer 36b has a multilayer structure including a perpendicular magnetization layer $36b_1$, an antiferromagnetic coupling layer $36b_2$, and a perpendicular magnetization layer $36b_3$ stacked on the intermediate layer 34 in this order. The magnetization direction of the perpendicular magnetization layer $36b_1$ and the magnetization direction of the perpendicular magnetization layer $36b_2$ are opposite (antiparallel) to each other.

The spin injection layer 36b of the spin torque oscillator 30 shown in FIG. 5 may have the same structure as that shown in FIG. 3 in which the antiferromagnetic coupling layer $36b_2$ and the perpendicular magnetization layer $36b_3$ are replaced with an antiferromagnetic layer. Furthermore, the spin injection layer 36b of the spin torque oscillator 30 shown in FIG. 5 may have the same structure as that shown in FIG. 4 in which the perpendicular magnetization layer $36b_1$ and the antiferromagnetic coupling layer $36b_2$ are replaced with a negative spin torque generating layer.

Like the first embodiment, the microwave-assisted magnetic head according to the first modification is suitable for generating a steep gradient magnetic field and improving the track recording density.

(Second Modification)

Figure 6:
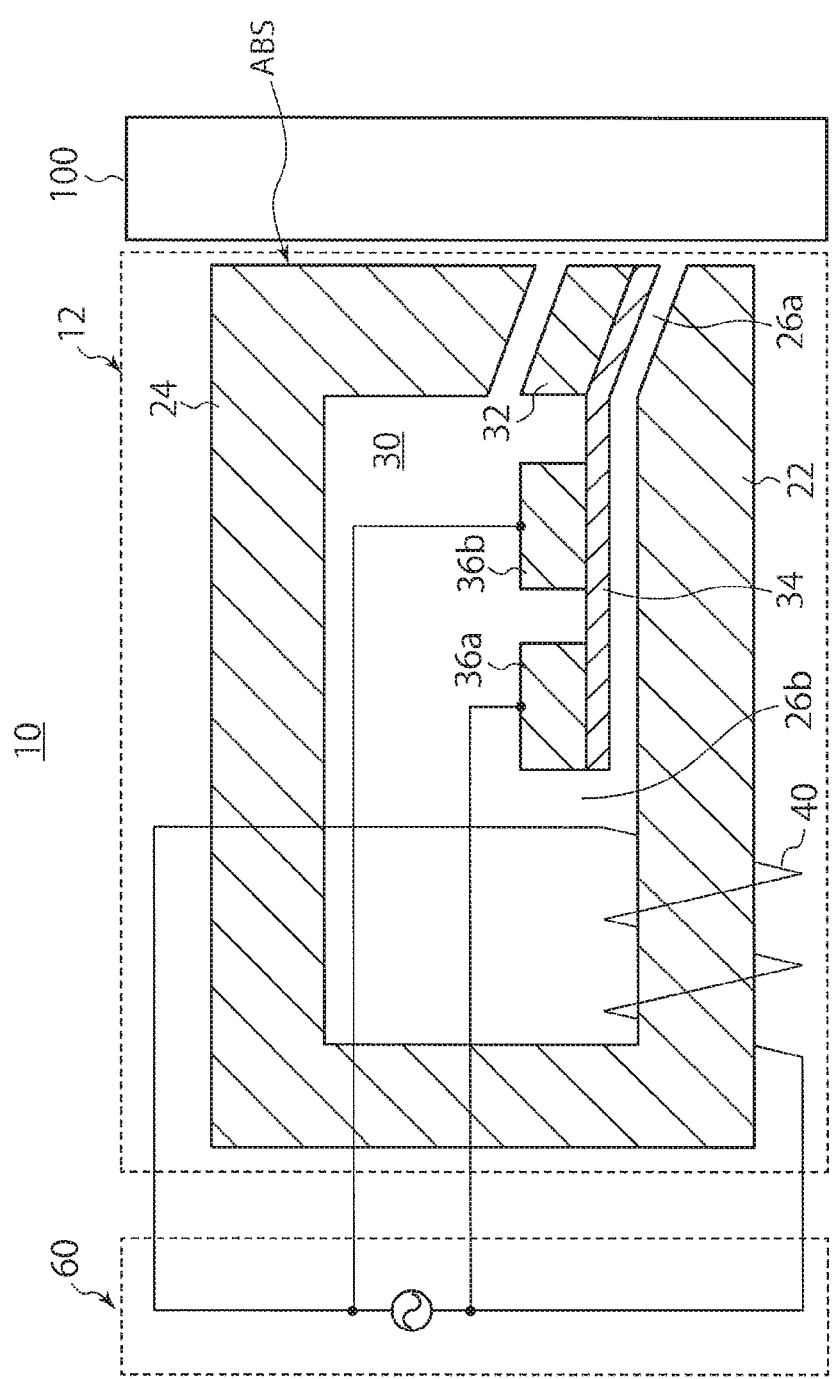
FIG. 6 is a diagram showing a magnetic recording head according to a second modification of the first embodiment.

FIG. 6 shows a magnetic recording head according to a second modification of the first embodiment. The recording gap 26a of the magnetic recording head 10 of the first embodiment shown in FIG. 1 extends toward the ABS in a perpendicular direction. However, the recording gap 26a of the magnetic recording head 10 according to the second modification is inclined to the trailing shield 24 side relative to the direction perpendicular to the ABS. The intermediate layer 34 in the spin torque oscillator 30 has a first portion that is along the slope of the recording gap 26a and a second portion connecting to the first portion and extends in a direction perpendicular to the ABS. Thus, the intermediate layer 34 is bent. The oscillation layer 32 is disposed to the first portion, and the spin injection layers 36a, 36b are disposed to the second portion. Although the oscillation layer 32 is disposed on the same side as the spin injection layers 36a, 36b on the intermediate layer 34 in FIG. 6, the oscillation layer 32 may be disposed on the opposite side to the spin injection layers 36a, 36b on the intermediate layer 34.

The magnetic recording head with the inclined recording gap 26a is difficult to manufacture, but has an advantage of an increase in the recording magnetic field Hr.

Like the first embodiment, the microwave-assisted magnetic head according to the second modification is suitable for generating a steep gradient magnetic field and improving the track recording density.

(Third Modification)

Figure 7:
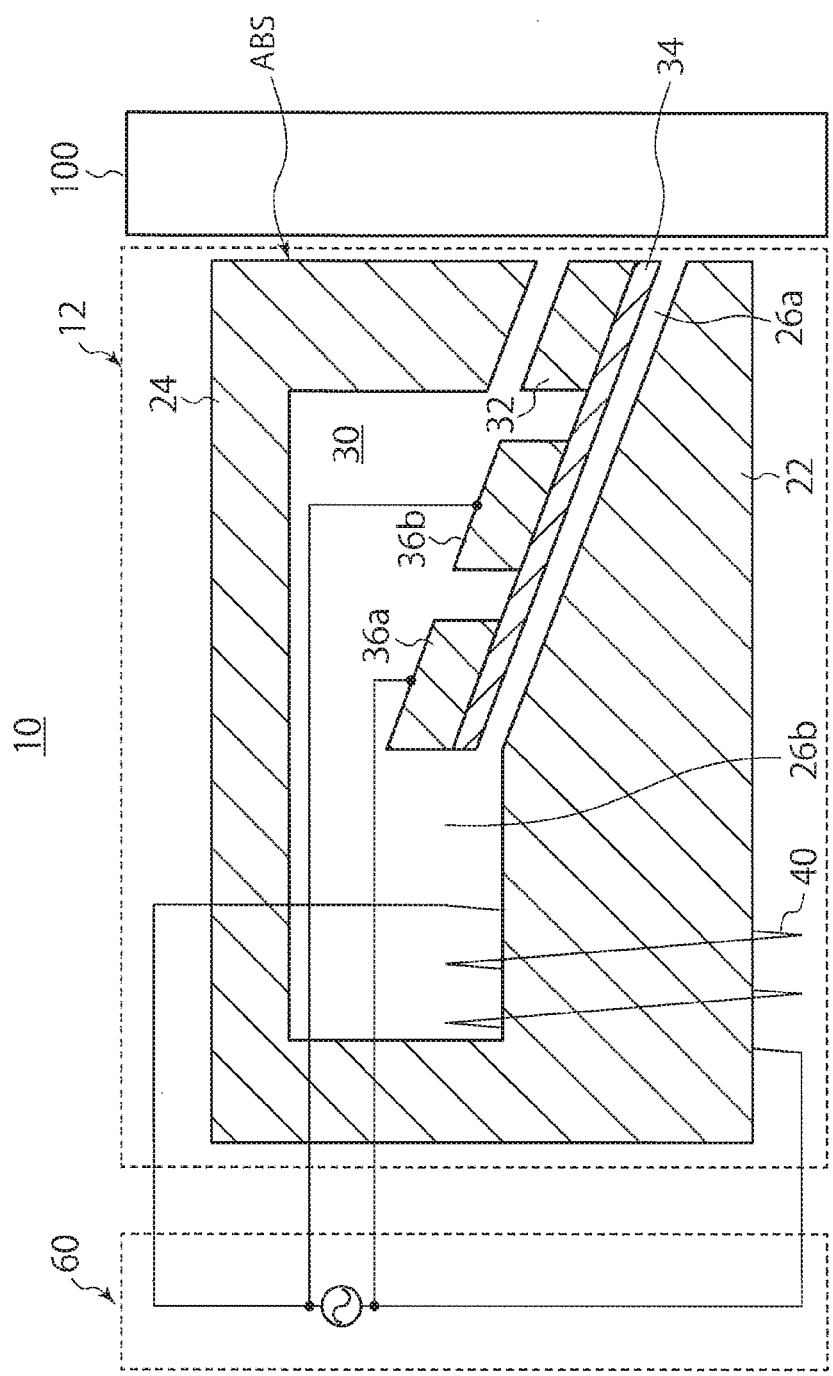
FIG. 7 is a diagram showing a magnetic recording head according to a third modification of the first embodiment.

FIG. 7 shows a magnetic recording head according to a third modification of the first embodiment. The recording gap 26a of the magnetic recording head 10 according to the third modification is inclined to the trailing shield 24 side relative to the direction perpendicular to the ABS. The intermediate layer 34 in the spin torque oscillator 30 is linearly disposed along the slope of the recording gap 26a. The oscillation layer 32 is disposed on the intermediate layer 34 within the recording gap 26a, and the spin injection layers 36a, 36b are disposed on the intermediate layer 34 in a gap 26b that is different from the recording gap 26a so as to be separated from each other and also separated from the oscillation layer 32. Although the oscillation layer 32 is disposed on the same side as the spin injection layers 36a, 36b on the intermediate layer 34 in FIG. 7, the oscillation layer 32 may be disposed on the opposite side to the spin injection layers 36a, 36b on the Intermediate layer 34.

Like the second modification, the magnetic recording head according to the third modification with the inclined recording gap 26a is difficult to manufacture, but has an advantage of an increase in the recording magnetic field Hr.

Like the first embodiment, the microwave-assisted magnetic head according to the third modification is suitable for generating a steep gradient magnetic field and improving the track recording density.

(Fourth Modification)

Figure 8:
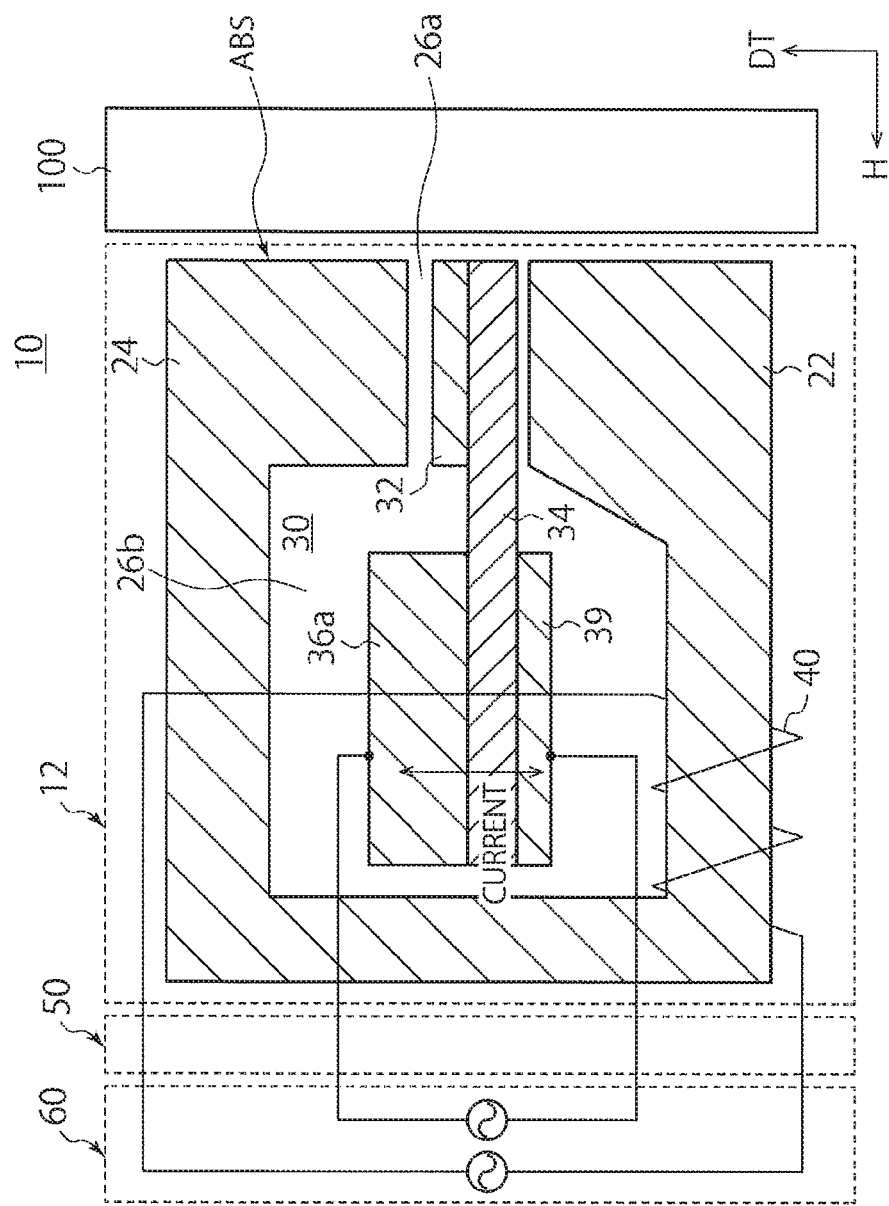
FIG. 8 is a diagram showing a magnetic recording head according to a fourth modification of the first embodiment.

FIG. 8 shows a magnetic recording head according to a fourth modification of the first embodiment. The magnetic recording head 10 according to the fourth modification is obtained by replacing the spin torque oscillator 30 of the magnetic recording head 10 according to the first embodiment shown in FIG. 1 with a spin torque oscillator 30 shown in FIG. 8. The spin torque oscillator 30 according to the fourth modification includes a nonmagnetic electrode layer 39 instead of the spin injection layer 36b in the spin torque oscillator 30 of the first embodiment shown in FIG. 1. Thus, in the spin torque oscillator 30 according to the fourth modification, a current flows between the spin injection layer 36a and the nonmagnetic electrode layer 39 via the intermediate layer 34. The amount of spin current injected to the intermediate layer 34 is half of that in the first embodiment including the two spin injection layers.

Like the first embodiment, the microwave-assisted magnetic head according to the fourth modification is suitable for generating a steep gradient magnetic field and improving the track recording density.

(Fifth Modification)

Figure 9:
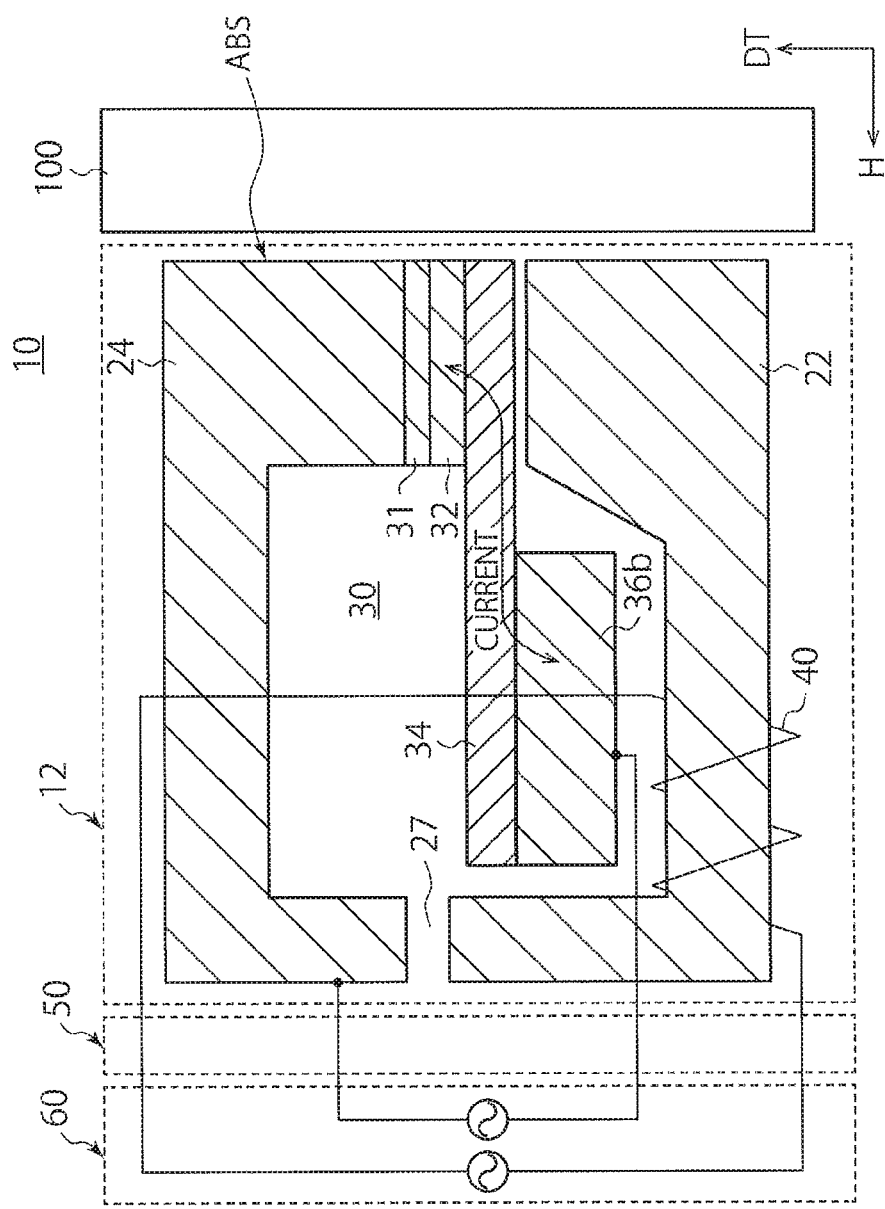
FIG. 9 is a diagram showing a magnetic recording head according to a fifth modification of the first embodiment.

FIG. 9 shows a magnetic recording head according to a fifth modification of the first embodiment. The magnetic recording head 10 according to the fifth modification is obtained by replacing the spin torque oscillator 30 of the magnetic recording head 10 according to the first embodiment shown in FIG. 1 with a spin torque oscillator 30 shown in FIG. 9. The spin torque oscillator 30 according to the fifth modification is obtained by removing the spin injection layer 36a from the spin torque oscillator 30 according to the first embodiment shown in FIG. 1, and disposing a metal layer 31 to fill the recording gap between the oscillation layer 32 and the trailing shield 24. The metal layer 31 is in contact with both the oscillation layer 32 and the trailing shield 24. This allows the drive current to flow between the spin injection layer 36b and the trailing shield 24. Therefore, the spin torque current flows between the spin injection layer 36b and the trailing shield 24 via the intermediate layer 34, the oscillation layer 32, and the metal layer 31.

Since the oscillation layer 32 and the trailing shield 24 are electrically connected to each other via the metal layer 31 in the fifth modification, a gap 27 is formed between the main magnetic pole 22 and the trailing shield 24 at the back side as shown in FIG. 9.

Like the first embodiment, the microwave-assisted magnetic head according to the fifth modification is suitable for generating a steep gradient magnetic field and improving the track recording density.

(Shape of Spin Torque Oscillator)

Figure 10:
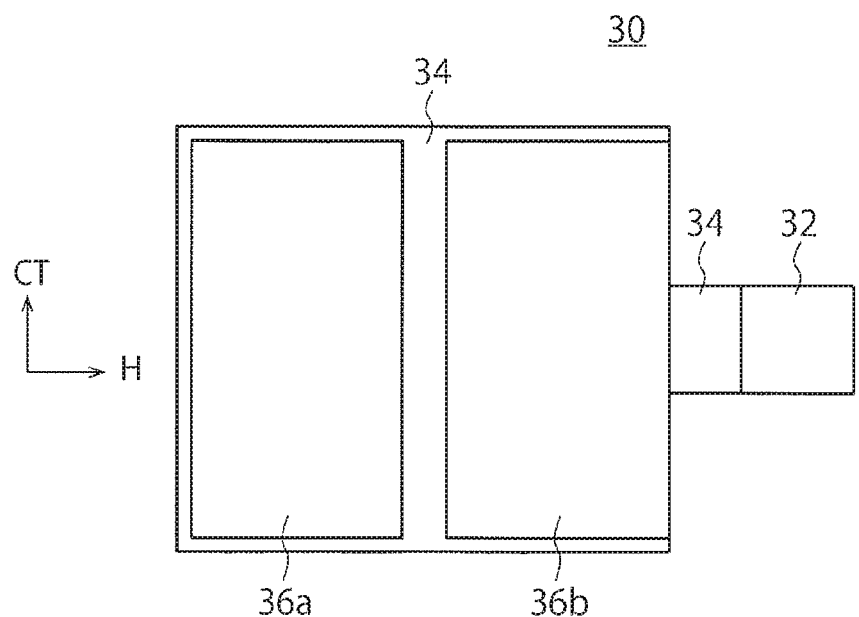
FIG. 10 is a plan view of the first example of the spin torque oscillator used in the first embodiment and its modifications.

Referring to FIG. 10, the shape of the spin torque oscillator in a plane perpendicular to the ABS and perpendicular to the moving direction of the magnetic recording medium, i.e., the plane "CT (Cross Track) direction×H (Height)" direction) will be described, taking the spin torque oscillator according to the first modification shown in FIG. 5 as an example.

Figure 11:
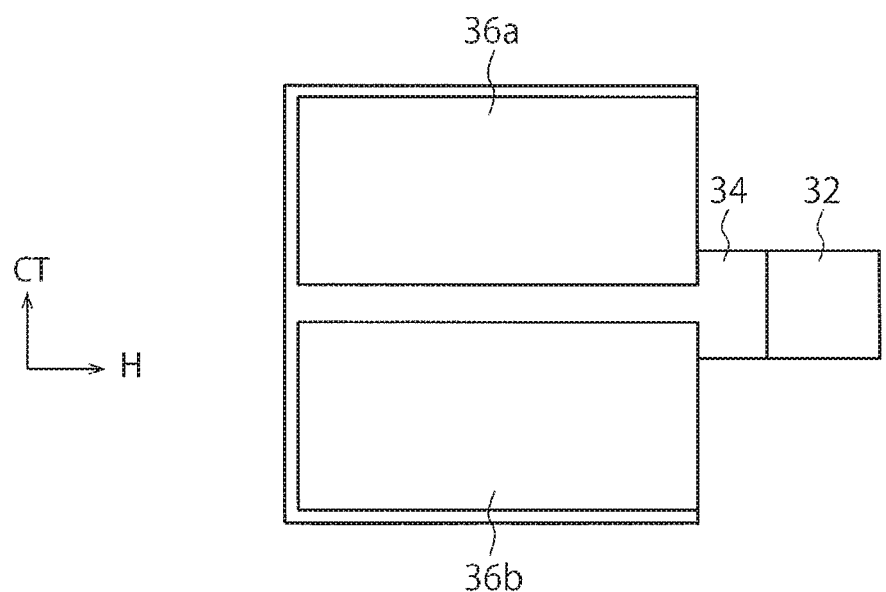
FIG. 11 is a plan view of a second example of the spin torque oscillator used in the first embodiment and its modifications.

As shown in FIG. 10, a structure in which the junction areas of the spin injection layers 36a, 36b with the intermediate layer 34 is increased can be obtained by arranging the spin injection layers 36a, 36b in parallel in the H direction, and increasing the length of the spin injection layers 36a, 36b in the CT direction to be greater than the length of the oscillation layer 32, so that the junction area of the spin injection layers 36a, 36b with the intermediate layer 34 becomes greater than that of the oscillation layer 32 in the CT direction. The spin injection layers 36a, 36b may be arranged in the CT direction, and the length in the H direction thereof may be made greater than that of the oscillation layer 32 to increase the junction areas of the spin injection layers 36a, 36b as shown in FIG. 11. As described above, the drive current flowing through the spin torque oscillator may be increased by increasing the junction areas of the spin injection layers 36a, 36b. This also increases the amount of spin injected to the intermediate layer 34, thereby increasing the amount of spin reaching the oscillation layer 32.

(Method of Manufacturing Spin Torque Oscillator)

A method of manufacturing a spin torque oscillator will be described with reference to FIGS. 12A to 12D.

Figure 12A:
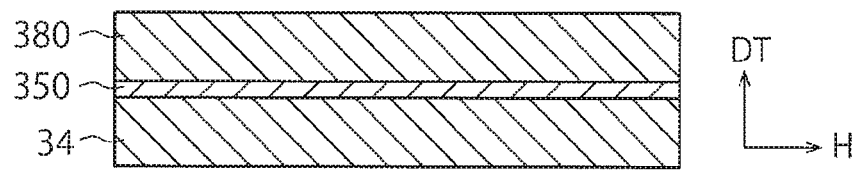
FIG. 12A is a cross-sectional view showing a method of manufacturing the spin torque oscillator used in the first embodiment and its modifications.

First, an intermediate layer 34, an interface layer 350, and a magnetic layer 380 are sequentially formed in a vacuum deposition apparatus (FIG. 12A). As a result, good crystallinity may be easily obtained around the interfaces thereof.

Figure 12B:
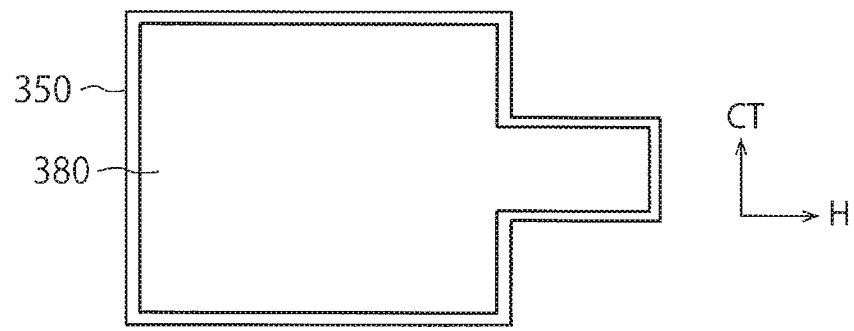
FIG. 12B is a plan view showing the method of manufacturing the spin torque oscillator used in the first embodiment and its modifications.

Subsequently, the planar shape of the intermediate layer 34 is defined by a commonly performed patterning step. The magnetic layer 380 on the intermediate layer 34 is also shaped at the same time (FIG. 12B).

Figure 12C:
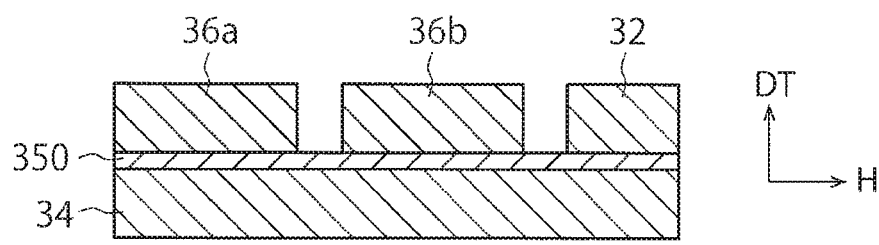
FIG. 12C is a cross-sectional view showing the method of manufacturing the spin torque oscillator used in the first embodiment and its modifications.
Figure 12D:
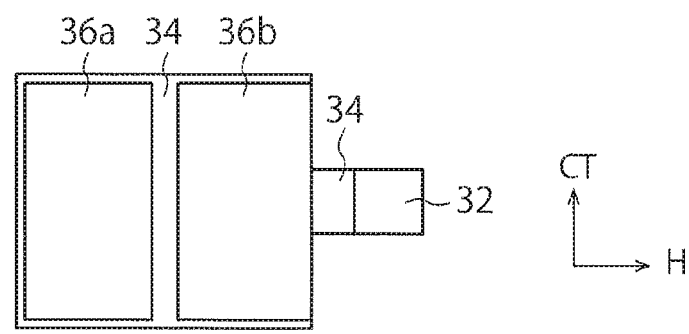
FIG. 12D is a plan view showing the method of manufacturing the spin torque oscillator used in the first embodiment and its modifications.

Thereafter, the magnetic layer 380 is patterned to form three magnetic layers, i.e., spin injection layers 36a, 36b and an oscillation layer 32 (FIG. 12C). The interface layer 350 works as an etching stopper at this time. As a result, a structure shown in FIG. 12D can be achieved.

This manufacturing method provides good crystallinity and avoids the problem of adjustment in position of the interval between the magnetic layers 36a, 36b. Accordingly, a spin torque oscillator with a fine interval between the magnetic layers 36a, 36b can be obtained. Narrowing the Interval between the magnetic layers allows the control of the loss in polarized spin diffusion in the intermediate layer 34. Accordingly, the spin torque can be efficiently transferred to the oscillation layer 32.

(Intermediate Layer of Spin Torque Oscillator)

The intermediate layer 34 of the spin torque oscillator will be described.

The intermediate layer 34 is formed of a metal-based nonmagnetic material in which the spin diffusion length is as long as submicron meters, e.g., Cu, Ag, Mg, and Al. The intermediate layer 34 may also be formed of graphene, which has a low resistance and in which the spin diffusion length is on the order of a few microns. It is not easy, however, to form the intermediate layer 34 with graphene.

In order to achieve a narrow recording gap that is needed to improve the recording density, it is preferable that the spin injection layer be disposed outside the recording gap, and the intermediate layer 34 be thinned. The interface resistance between metal-based spin injection layer and oscillation layer and a metal-based intermediate layer is considerably low. Generally, the interface resistance (the areal resistance RA) of a metal-based material is about 0.001 $\Omega\mu m^2$. If the intermediate layer 34 is thinned, the resistance of the intermediate layer 34 increases and the imbalance with the interface resistance may be caused. If this happens, the ratio of the spin current (spin torque amount) returning to the spin injection layer to the spin current reaching the oscillation layer 32 increases. This makes the oscillation layer difficult to oscillate.

Figure 13:
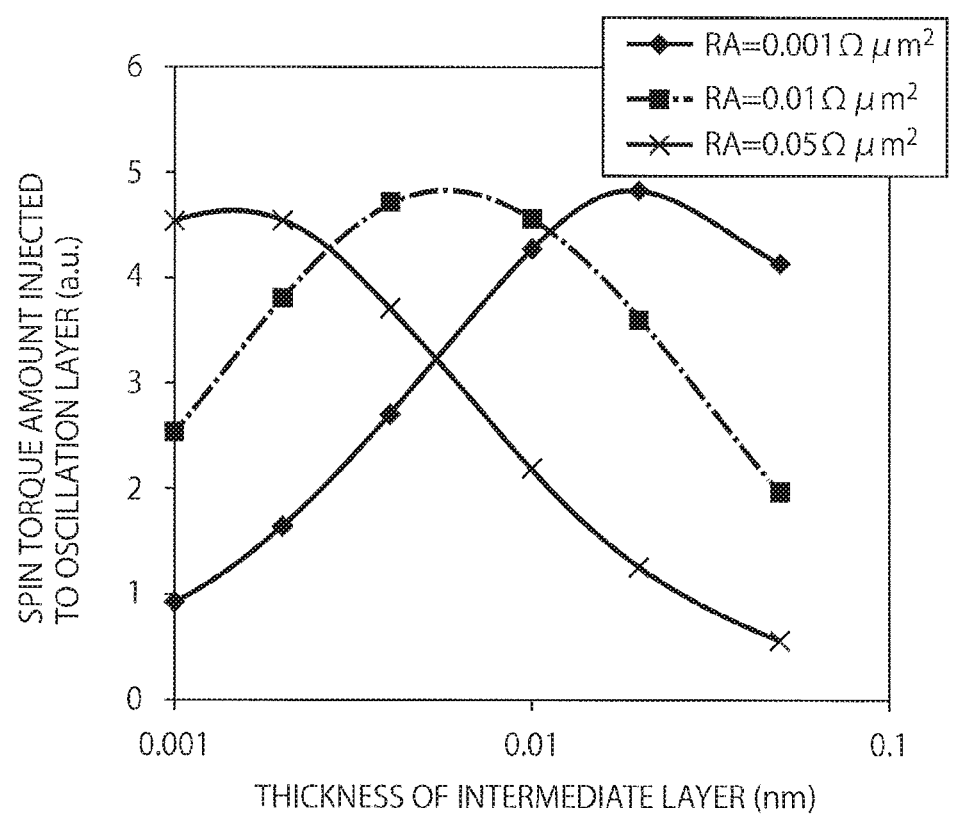
FIG. 13 is a diagram showing the dependency of the spin torque amount injected to the oscillation layer on the thickness of the intermediate layer.

The Inventors obtained, by a simulation, the relationship between the thickness of the Intermediate layer 34 and the amount of spin torque introduced to the oscillation layer 32 using the areal resistance RA at the interface between the spin injection layer and the intermediate layer as a parameter. The simulation result is shown in FIG. 13. The simulation was performed for three values of areal resistance RA, 0.001 $\Omega\mu m^2$, 0.01 $\Omega\mu m^2$, and 0.05 $\Omega\mu m^2$.

FIG. 13 shows the simulations results so that the maximum value of the spin torque amount for each areal resistance RA is the same in each case. The upper limit of the flowing current, i.e. reliability problem varies depending on the areal resistance RA. Therefore, it is difficult to compare the absolute values of the spin torque for different areal resistances RA. However, it is possible to compare the optimum thicknesses of the intermediate layer for the respective areal resistances RA, with which the spin torque becomes a maximum value. It could be understood from FIG. 13 that the thickness of the intermediate layer that makes the spin current maximum for a metal-based material is about 10 nm. If an intermediate layer with a thickness less than 10 nm is used, the spin current becomes lower. The resistivity of Cu is considered in the simulations.

If an interface layer with a suitable areal resistance RA, for example RA=0.01 $\Omega\mu m^2$, is disposed at the interface between the spin injection layer and the intermediate layer, a great ratio of spin current arriving at the oscillation layer may be achieved by disposing an Intermediate layer of Cu, for example, with a thickness of up to 5 nm that is suitable for the narrow recording gap. The value RA=0.01 $\Omega\mu m^2$ is about 10 times the areal resistance generally measured at the interface with a metal.

An interface layer having an areal resistance RA of more than 0.05 $\Omega\mu m^2$ provides a large ratio of the spin current arriving at the oscillation layer if the thickness of the intermediate layer is equal to or more than 2 nm. However, the film quality control may become difficult in this case. An interface layer with a high areal resistance RA may not allow a current to flow easily. Therefore, the areal resistance RA of the interface layer is preferably in the range of 0.01 $\Omega\mu m^2$ to 0.05 $\Omega\mu m^2$. Few materials with such a low areal resistance RA are known at present. However, this value may be achieved by disposing an interface layer for inducing current constriction including an ultrathin oxide layer with a high-purity metal path (with an occupation ratio of about 10%). It may be possible to simply reduce the size of the spin injection layer to increase the areal resistance. However, since the heat caused by Joule heating is not efficiently dissipated in this case, the current does not flow easily. In contrast, the heat dissipation of the interface layer inducing the current constriction is very good. Therefore, a large current is caused to flow, and a large spin current is transferred to the oscillation layer. It is reported that the areal resistance of a CPP (current perpendicular to plane)-GMR element in which layers of CoFeGeGa alloy and CuZn alloy are stacked is 0.02 $\Omega\mu m^2$ (for example, see "59$^{th}$ MMM Conference Digest, DQ-04" (2014)). Disposing a CuZn layer at the interface of the spin injection layer and the oscillation layer with the nonmagnetic layer, or using CuZn to form the nonmagnetic layer would make the interface areal resistance be greater than 0.01 $\Omega\mu m^2$.

(Oscillation Layer of Spin Torque Oscillator)

Figure 14:
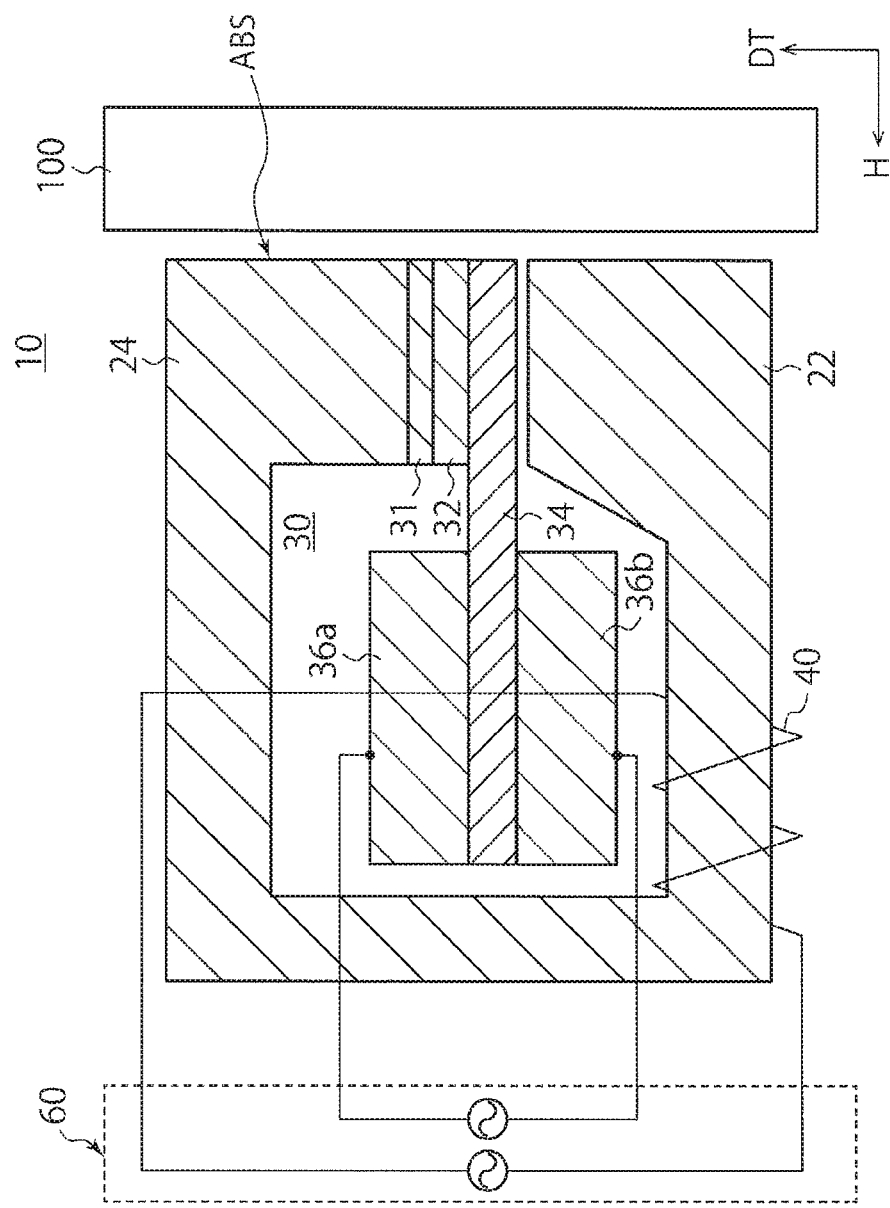
FIG. 14 is a diagram showing a magnetic recording head according to a sixth modification of the first embodiment.

Materials with a large saturation magnetic field such as a FeCo alloy and a multilayer film in which layers of Fe and Co are alternately stacked are used to form the oscillation layer, as in conventional microwave-assisted recoding apparatuses. An interface layer with an areal resistance RA in the range of 0.01 $\Omega\mu m^2$ to 0.05 $\Omega\mu m^2$ may be disposed between the oscillation layer and the intermediate layer, as in the case of the spin injection layer. It may be possible that an interface layer be disposed between the spin injection layer and the intermediate layer, and no interface layer is disposed between the oscillation layer and the intermediate layer. Since no electrode is needed in a recording operation to cause a current to flow through the oscillation layer, an Insulating layer is preferably disposed between the oscillation layer and the main magnetic pole or between the oscillation layer and the trailing shield. However, checking the spin torque characteristics when respective magnetic recording heads are arranged along a line during manufacture is preferable in order to improve the yield of desired products. For this purpose, the oscillation layer 32 is preferably connected to the main magnetic pole 22 or trailing shield 24 via a metal layer 31 on the opposite side to the intermediate layer 34, as in the magnetic recording head according to a sixth modification shown in FIG. 14. In this case, the intermediate layer 34 is stacked via an insulating layer that is not shown in FIG. 14 on the main magnetic pole 22 or trailing shield 24 on the side where the oscillation layer 32 is not present. In FIG. 14, the oscillation layer 32 is connected to the trailing shield 24 via the metal layer 31.

The presence of the metal layer 31 connecting the oscillation layer 32 and the main magnetic pole 22 or trailing shield 24 in the slider enables the measurement of the potential between the metal layer 31 and the spin injection layer to determine whether the oscillation of the oscillation layer 32 may be satisfactory or not. The potential is measured with a voltmeter with infinite internal impedance.

(Current Drive and Control Circuit 60)

The current drive and control circuit 60 used in the first embodiment and the first to fifth modifications thereof will be described below.

As shown in FIG. 1, the current drive and control circuit 60 for driving and controlling the drive current caused to flow through the recording coil 40 and a current for driving the spin torque oscillator is disposed in, for example, a magnetic recording apparatus that is not shown in FIG. 1. The current drive and control circuit 60 is connected to the slider 12 via the suspension 50. The current drive and control circuit 60 has a function of switching the polarity (direction) the recording coil to determine the recording direction, like common recording coil driving circuits. The current drive and control circuit 60 has a similar polarity switching function for a drive current for driving the spin torque oscillator 30, and a function of substantially simultaneously switching the currents flowing through the recording coil 40 and the spin torque oscillator 30. As a result, the currents are switched substantially in sync with each other.

Figure 15:
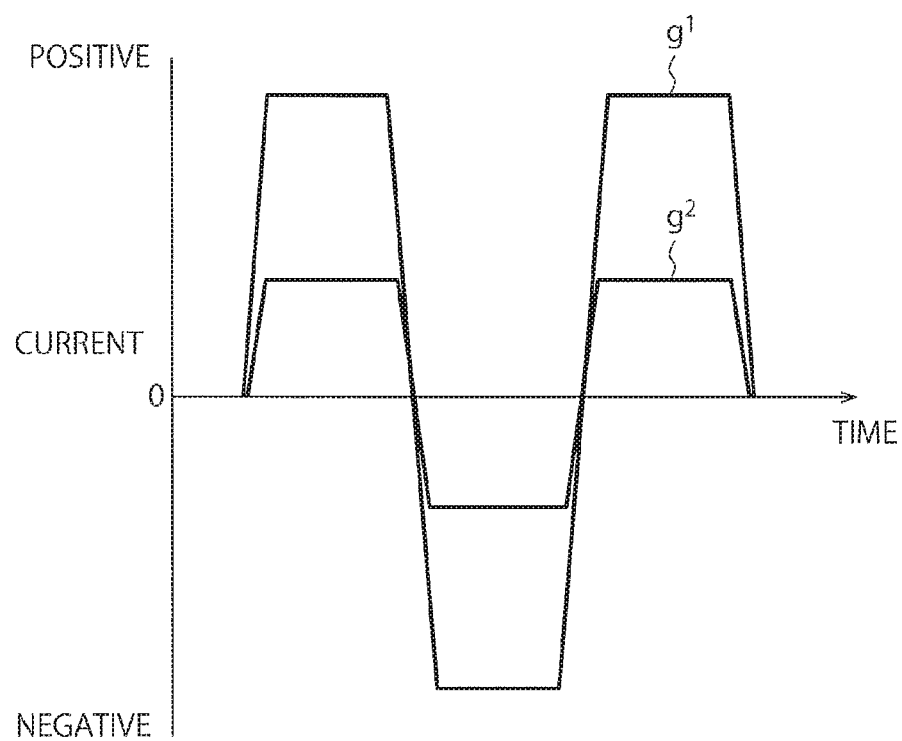
FIG. 15 is a diagram showing the switching characteristic of a drive current switched by a current drive and control circuit.

FIG. 15 shows an example of polarity switching. The line graph $g_1$ shows an example of drive current waveform for driving the recording coil 40, and the line graph g2 shows an example of drive current waveform of the spin torque oscillator in FIG. 15. As can be understood from FIG. 15, the polarity (positive or negative) of the drive current for driving the spin torque oscillator 30 is switched in sync with the switching in polarity (positive or negative) of the drive current of the recording coil 40. Generally, the drive current of the spin torque oscillator 30 is in the range of 1 mA to 10 mA, and the drive current of the recording coil 40 is in the range of 10 mA to 100 mA. For example, a positive current represents the recording of an upward magnetization, and a negative current represents the recording of a downward magnetization. The timing of switching the polarity of current is determined in accordance with a desired recorded pattern.

FIG. 16 shows differences in the direction of the magnetization in the spin injection layer and the direction in drive current of the spin torque oscillator 30 between conventional microwave-assisted recording and the microwave-assisted recording according to any one of the first embodiment and its modifications.

The principle of the conventional microwave-assisted recording is as follows. First, the spin injection layer is located in the recording gap to maintain a determined direction of the drive current in the spin torque oscillator. As the direction of the magnetic field in the recording gap is switched in response to the switching of the drive current in the recording coil between the positive direction and the negative direction, the magnetization direction of the spin injection layer is also switched. The switching makes the magnetization direction in the spin injection layer to be opposite to the spin torque direction, and the rotational direction of the high-frequency magnetic field of the oscillation layer is reversed. As a result, the rotation of the high-frequency magnetic field Hac is changed between the clockwise direction and the anticlockwise direction in sync of the polarity (positive or negative) of the recording magnetic field Hr. Since the rotational direction of the high-frequency magnetic field is changed in accordance with the direction in the recording magnetic field, a similar assisting effect can be obtained for the recording magnetic fields with both the positive and negative polarities.

If the spin injection layer is disposed outside the recording gap to limit the magnetic field in the recording gap, however, the above principle is difficult to hold, which makes it difficult to perform microwave-assisted recording.

The inventors have performed an intensive study using the principle analysis and the simulations to find that the rotational direction of spin torque may be switched even if the polarity of the drive current of the spin torque oscillator is switched with the magnetization of the spin injection layer being fixed. The inventors have achieved the present invention using this principle.

In the first embodiment and its modifications, a large drive current is caused to flow through the recording coil in the polarity switching to make the rising of the recording magnetic field steep. This is preferably applied to the drive current of the spin torque oscillator to have a similar rising waveform to that of the drive current of the recording coil.

Figure 17:
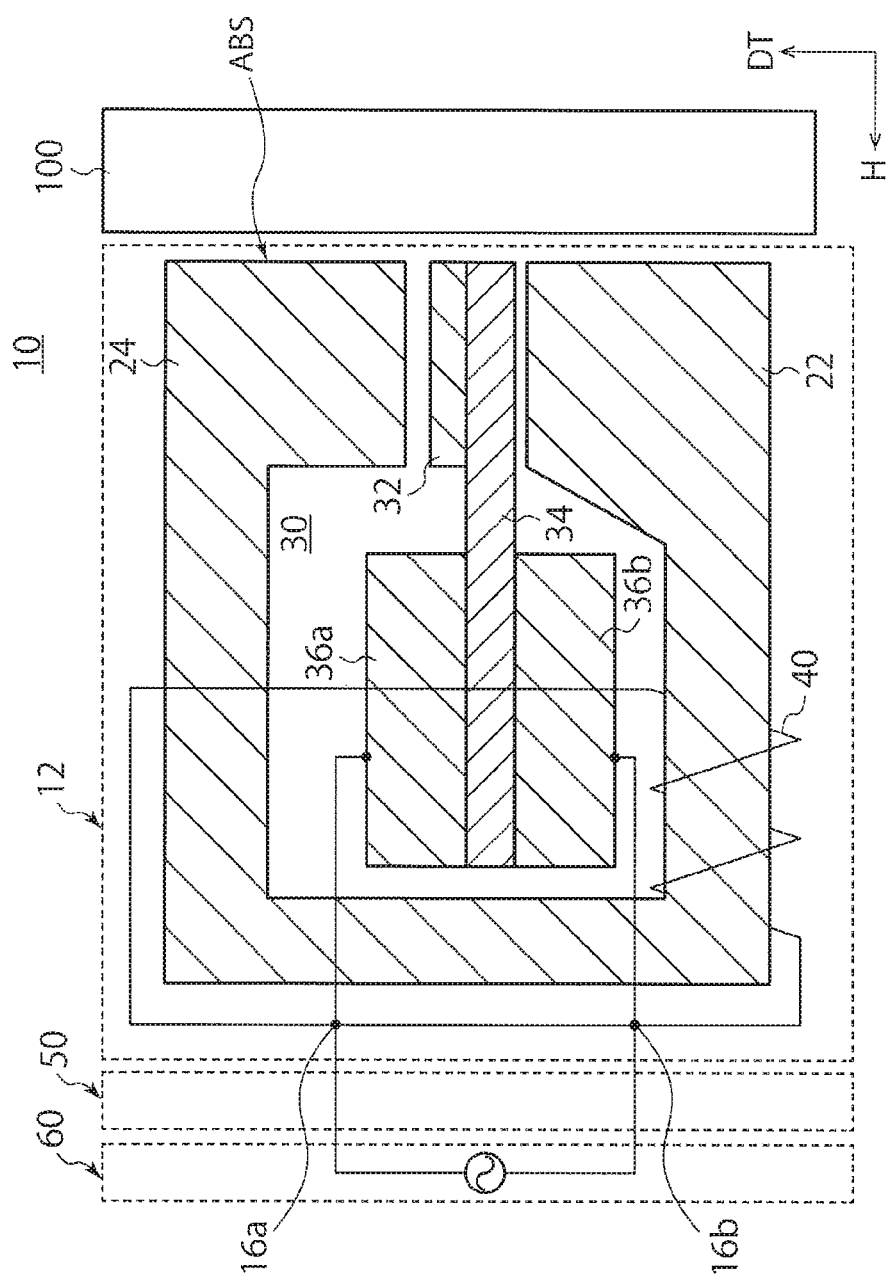
FIG. 17 is a diagram showing a magnetic recording head according to a seventh modification of the first embodiment.

In the first embodiment and its modifications, the drive current of the spin torque oscillator 30 may be caused to be independent of the current for the recording coil 40 by separately disposing an electrode pad in the head slider 12 as shown in FIG. 1. Alternatively, electrode pads 16a, 16b for the spin torque oscillator 30 and the recording coil 40 may have a common line, which is branched in the slider 12 to cause currents to flow through the recording coil 40 and the spin torque oscillator 30 as in a magnetic recording head according to a seventh modification shown in FIG. 17. The number of electrode pads may be reduced in this case. Generally, the resistance of the recording coil 40 is on the order of a few Ω, and the resistance of the spin torque oscillator 30 is on the order of a few tens Ω. Accordingly, an appropriate current may be caused to flow through the spin torque oscillator 30 by insetting a small resistance into the electrode line of the spin torque oscillator 30. Since future hard disk drives (HDDs) may include a plurality of reproducing head elements, the increase in the number of electrode pads may cause a significant problem.

Figure 18:
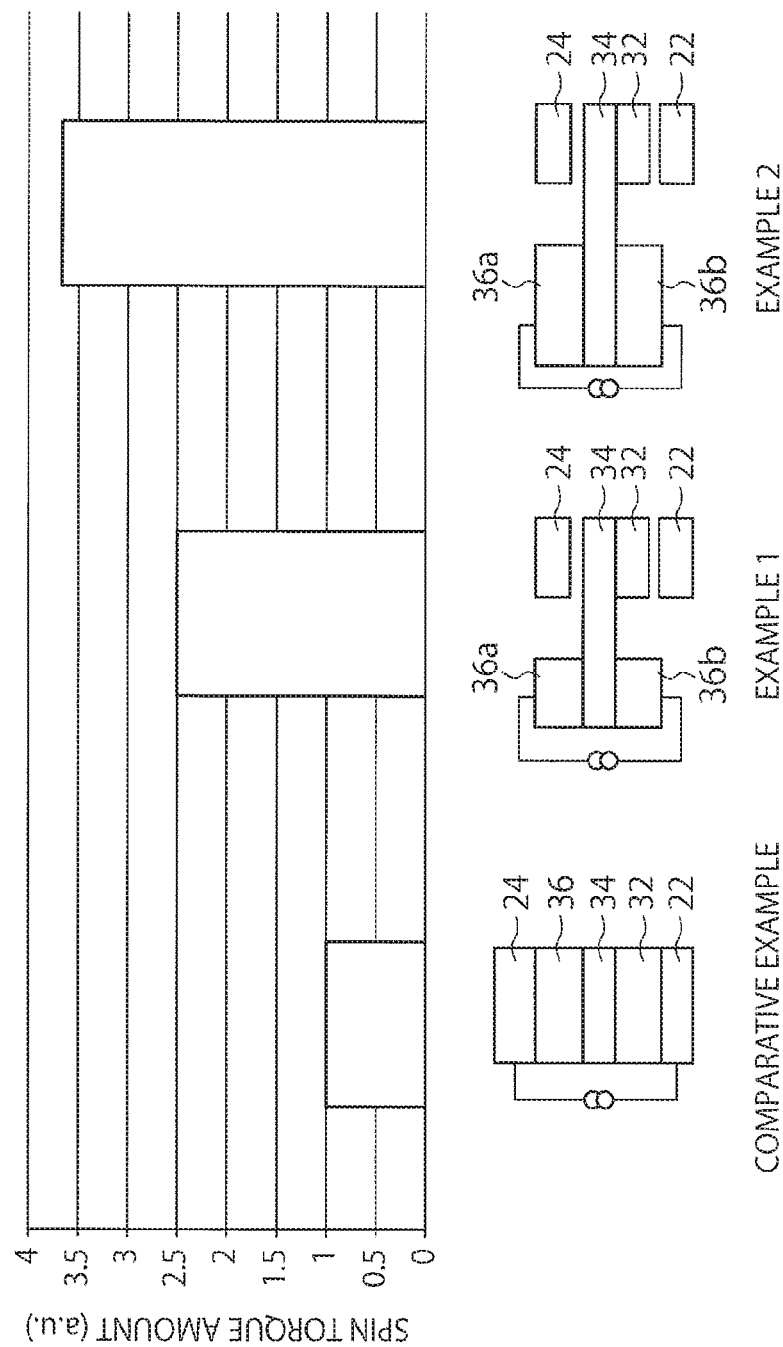
FIG. 18 is a diagram showing the result of simulations for obtaining the amount of spin torque injected to the oscillation layer of the spin torque oscillator in each of Example 1, Example 2, and Comparative Example.

FIG. 18 shows the amount of spin torque transferred to the oscillation layer 32 of the spin torque oscillator in each of Example 1, Example 2, and Comparative Example obtained by simulations.

Comparative Example represents a spin torque oscillator used for conventional microwave-assisted recording. In Comparative Example, a spin torque oscillator including an oscillation layer 32, an intermediate layer 34, and a spin injection layer 36 is disposed between a main magnetic pole 22 and a trailing shield 24.

Example 1 represents the spin torque oscillator according to the first embodiment shown in FIG. 1. In Example 1, the junction area of the spin injection layers 36a, 36b with the intermediate layer 34 is the same as the junction area of the oscillation layer 32 with the Intermediate layer 34.

Example 2 also represents the spin torque oscillator according to the first embodiment shown in FIG. 1. In Example 2, the junction area of the spin injection layers 36a, 36b with the intermediate layer 34 is nine times the junction area of the oscillation layer 32 with the intermediate layer 34. For example, the length of the spin Injection layers 36a, 36b is three times the length of the oscillation layer 32 in the CT direction, and three times thereof in the H direction.

As can be understood from FIG. 18, the amount of spin torque transferred to the oscillation layer 32 in Example 1 is more than 2 times that in Comparative Example, and the amount of spin torque transferred to the oscillation layer 32 in Example 2 is more than 3.5 times that of Comparative Example. The magnetic volume that can oscillate of the oscillation layer may be increased as the amount of spin torque increases. As a result, the high-frequency magnetic field may be increased as the magnetic volume of the oscillation layer is increased, in addition to the improvement in track recording density caused by the narrower recording gap.

Second Embodiment

A magnetic recording apparatus according to a second embodiment will be described below.

The magnetic recording heads according to the first embodiment and its modifications may be incorporated into, for example, recording and reproducing type magnetic head assemblies, and further mounted on magnetic recording and reproducing apparatuses (HDDs). The magnetic recording apparatus according to the second embodiment may have a recording function, and may have both a recording function and a reproducing function. In this case, the magnetic recording apparatus also includes a reproduction unit for reproducing the data written in a magnetic recording medium.

Figure 19:
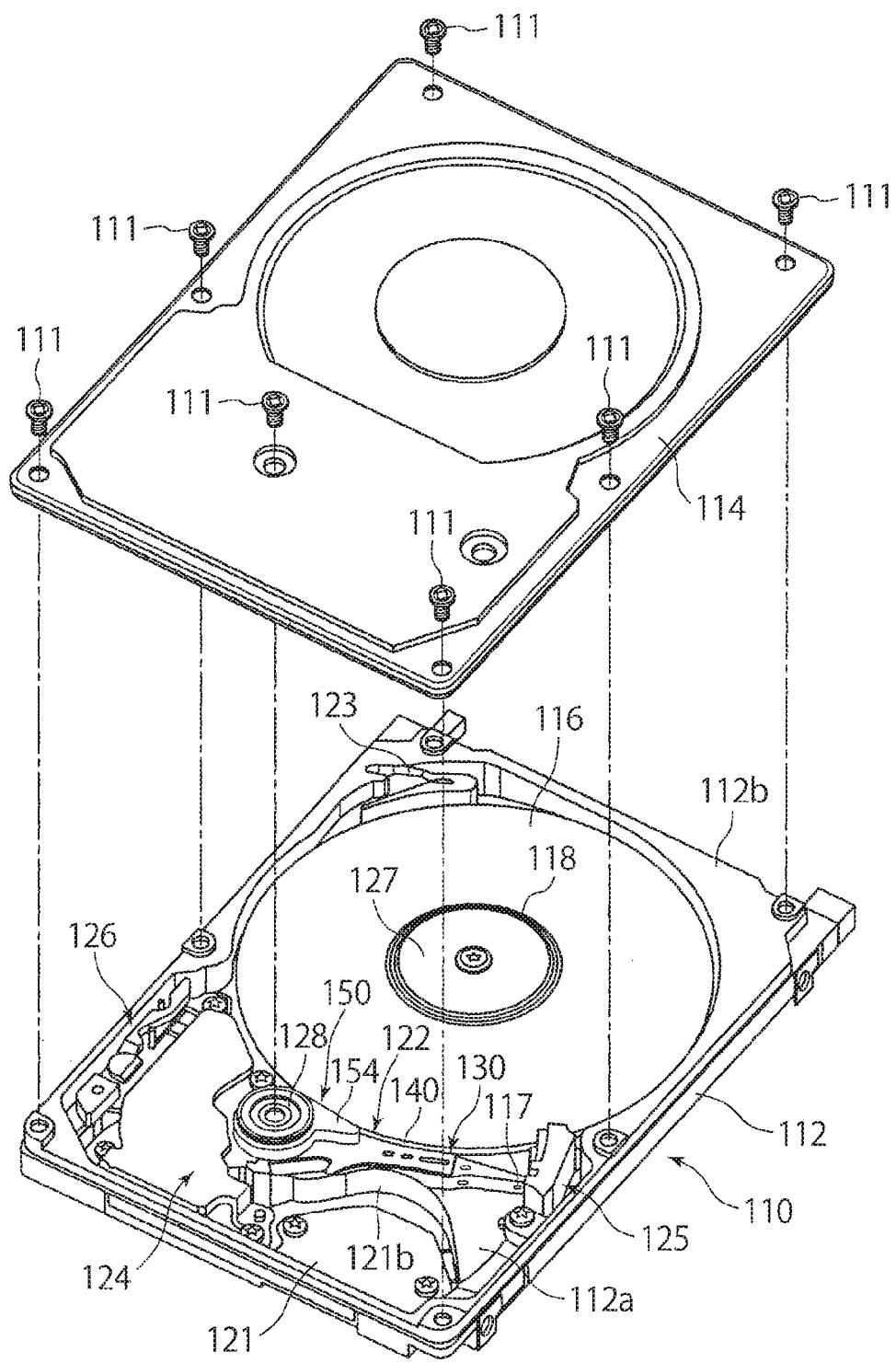
FIG. 19 is a perspective view showing the structure of a magnetic recording apparatus according to a second embodiment.

FIG. 19 is a perspective view showing the structure of the magnetic recording apparatus according to the second embodiment. As shown in FIG. 19, the magnetic recording apparatus includes a housing 110. The housing 110 includes a base 112 in a rectangular box shape, of which the top surface is open, and a top cover 114 to be fastened to the base 112 by a plurality of bolts 111 to close the opening on the top surface of the base 112. The base 112 includes a bottom plate 112a in a rectangular shape, and a sidewall 112b standing along the periphery of the bottom plate 112a.

The housing 110 houses a magnetic disk 116 serving as a recording medium, and a spindle motor 118 serving as a driving unit for supporting and rotating the magnetic disk 116. The spindle motor 118 is disposed on the bottom plate 112a. The housing 110 has a size enabling the housing of plural, for example two, magnetic disks, and the spindle motor 118 is capable of supporting and driving two magnetic disks.

The housing 110 also houses a plurality of hard disk heads 117 for recording information to and reproducing information from the magnetic disk 116, a head stack assembly ("HSA") 122 for supporting the hard disk heads 117 so as to be freely moved relative to the magnetic disk 116, a voice coil motor ("VCM") 124 for pivoting and positioning the HSA 122, a ramp loading mechanism 125 for moving and holding the hard disk head 117 at a retracting position that is at a distance from the magnetic disk 116 when the hard disk head 117 reaches the outermost portion of the magnetic disk 116, a latch mechanism 126 for holding the HSA 122 at the retreating position when an impact is given to the HDD, and a substrate unit 121 including a preamplifier. A printed circuit board that is not shown is fastened by bolts to the outer surface of the bottom plate 112a of the base 112. The printed circuit board controls operations of the spindle motor 118, the VCM 124, and the hard disk heads 117 via the substrate unit 121. A circulation filter 123 for capturing dusts within the housing by driving a movable portion thereof is provided to a sidewall of the base 112 at a position outside the magnetic disk 116.

The magnetic disk 116 has a diameter of, for example, 65 mm (2.5 inches), and includes magnetic recording layers under the top surface and above the bottom surface. The magnetic disk 116 is coaxially engaged with a hub (not shown) of the spindle motor 118, and clamped by a clamp spring 127 to be fixed to the hub. In this manner, the magnetic disk 116 is supported to be in parallel with the bottom plate 112a of the base 112. The magnetic disk 116 is rotated by the spindle motor 118 at a predetermined speed, for example, 5400 rpm or 7200 rpm.

Figure 20:
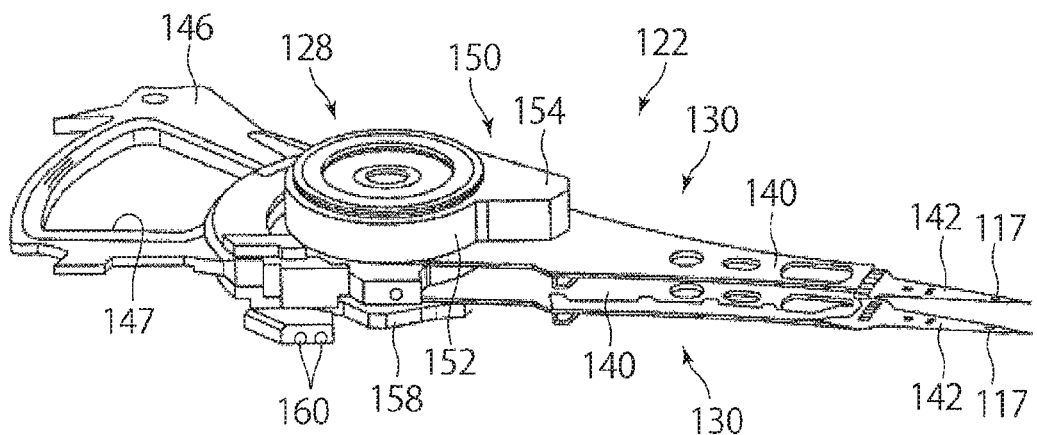
FIG. 20 is a perspective view of a head stack assembly.
Figure 21:
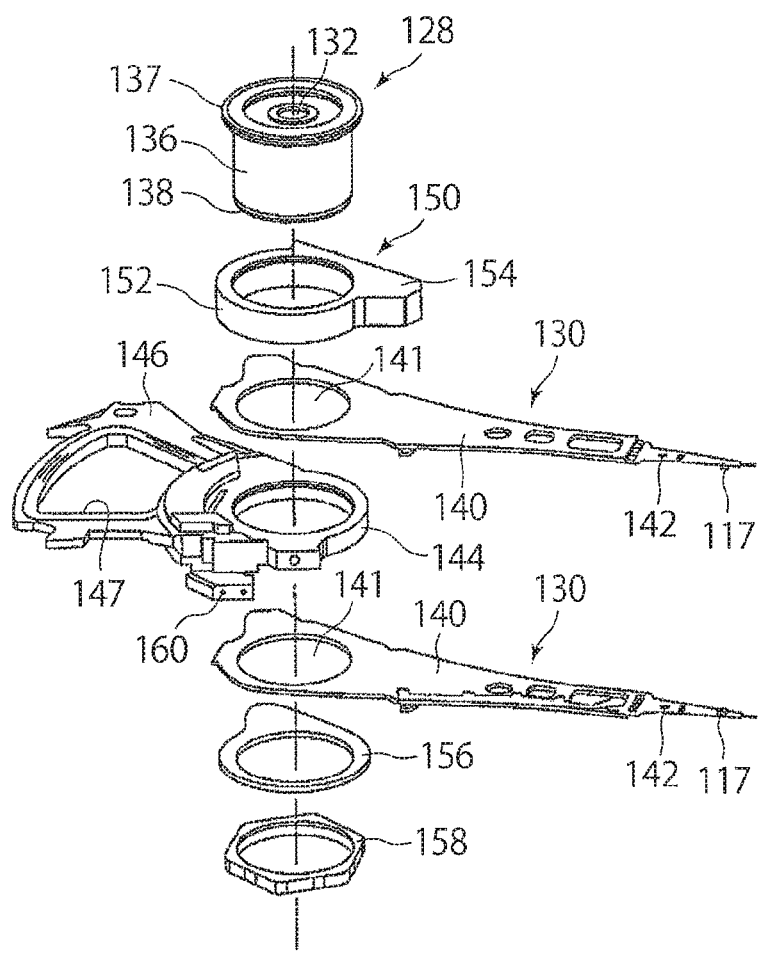
FIG. 21 is an exploded perspective view of a head stack assembly.

FIG. 20 is a perspective view showing the head stack assembly (HSA) 122 of the magnetic recording apparatus according to the second embodiment, and FIG. 21 is an exploded perspective view of the HSA 122. As shown in FIGS. 20 and 21, the HSA 122 includes a bearing unit 128 that can be freely rotated, two head gimbal assemblies ("HGAs") 130 extending from the bearing unit 128, a spacer ring 144 disposed within the HGAs 130, and a dummy spacer 150.

The bearing unit 128 is located along the longitudinal direction of the base 112 at a distance from the rotation center of, and near the outer periphery of the magnetic disk 116. The bearing unit 128 includes a pivot axis 132 standing on the bottom plate 112a of the base 112, and a sleeve 136 in a cylindrical shape, which is coaxially supported by the pivot axis 132 so as to be rotated freely around the pivot axis 132 via the bearings 134. A flange 137 in a ring shape is disposed on the upper portion of the sleeve 136, and a screw portion 138 is formed on the outer periphery of the lower portion. The sleeve 136 of the bearing unit 128 has a size, i.e., a length in the axial direction, sufficiently enough to fix, for example, at maximum four HGAs and spacers between the adjacent HGAs 140.

In the second embodiment, the number of magnetic disk 116 is one. Accordingly, two HGAs 130, which are fewer than the maximum attachable number of four, are fixed to the bearing unit 128. Each HGA 130 includes an arm 140 extending from the bearing unit 128, a suspension 142 extending from the arm, and a hard disk head 117 supported at the extended end of the suspension via a gimbal portion.

The arm 140 has a laminate structure of, for example, stainless steel, aluminum, and stainless steel, which is formed in a thin flat plate shape. A circular through-hole 141 is formed on one end, i.e., the base end thereof. The suspension 142 is formed of a narrow and long leaf spring, the base portion of which is fixed to an end of the arm 140 by spot welding or gluing so that the suspension 142 extends from the arm 140. The suspension 142 and the arm 140 may be integrally formed of the same material.

The hard disk head 117 is one of the magnetic recording heads according to the first embodiment and its modifications, and includes a substantially rectangular slider (not shown) and a recording head formed on the slider. The hard disk head 117 is fixed to the gimbal portion formed at a tip portion of the suspension 142. Furthermore, the hard disk head 117 includes four electrodes, which are not shown. A relay flexible printed circuit board ("relay FPC") is disposed on the arm 140 and the suspension 142, and the hard disk head 117 is electrically connected to a main FPC 121b via the relay FPC.

The spacer ring 144 is formed of aluminum or the like to have a predetermined thickness and a predetermined outside diameter. A support frame 146 of a synthetic resin is integrally formed with the spacer ring 144 and extends outwardly from the spacer ring. A voice coil 147 of the VCM 124 is fixed to the support frame 146.

The dummy spacer 150 includes a spacer body 152 in an annular shape, and a balance adjusting portion 154 extending from the spacer body. The dummy spacer 150 is integrally formed of a metal such as stainless steel. The outside diameter of the spacer body 152 is the same as that of the spacer ring 144. Therefore, the outside diameter of a portion of the spacer body 152 contacting the arm is the same as the outside diameter of a portion of the spacer ring 144 contacting the arm. The thickness of the spacer body 152 is the sum of the thicknesses of the arms of the HGAs, the number of which is fewer than the maximum number, two in this case, and the thicknesses of the spacer rings disposed therebetween.

The dummy spacer 150, the two HGAs 130, and the spacer ring 144 are engaged with the outer periphery of the sleeve 136 of the bearing unit 128 with the sleeve 136 being inserted into the inner hole of the spacer body 152, the through-hole 141 of the arm 140, and the inner hole of the spacer ring. Thus the dummy spacer 150, the two HGAs 130, and the spacer ring 144 are stacked on the flange 137 along the axial direction of the sleeve. The spacer body 152 of the dummy spacer 150 is engaged with the outer periphery of the sleeve 136 so as to be disposed between the flange 137 and one of the arms 140, and the spacer ring 144 is engaged with the outer periphery of the sleeve 136 so as to be disposed between the two arms 140. A washer 156 in an annular shape is engaged with the lower periphery of the sleeve 136.

The dummy spacer 150, the two arms 140, the spacer ring 144, and the washer 156 engaged with the outer periphery of the sleeve 136 are sandwiched between a nut 158 engaged with the screw portion 138 of the sleeve 136 and the flange 137 to be fixed to the outer periphery of the sleeve.

The two arms 140 are located at predetermined positions in the circumferential direction of the sleeve 136, and extend in the same direction from the sleeve. As a result, the two HGAs are integrally rotated with the sleeve 136, and face each other with a predetermined distance therebetween in parallel with the surface of the magnetic disk 116. The support frame 146 integrally formed with the spacer ring 144 extends from the bearing unit 128 in the opposite direction to the arms 140. Two terminals 160 in a pin shape project from the support frame 146, and electrically connect to the voice coil 147 via a wiring (not shown) embedded in the support frame 146.

The suspension 142 has lead lines (not shown) for writing and reading signals, which are connected to respective electrodes of the magnetic head incorporated into the slider. Furthermore, an electrode pad (not shown) is provided to the magnetic head assembly 130.

A signal processing unit (not shown) for writing signals to and reading signals from the magnetic recording medium using the magnetic head is provided. The signal processing unit is disposed on the back side of the magnetic recording and reproducing apparatus shown in FIG. 19. The input and output lines of the signal processing unit are connected to the electrode pad and electrically coupled to the magnetic head.

Thus, the magnetic recording apparatus according to the second embodiment includes a magnetic recording medium, the magnetic recording heads according to any of the first embodiment and its modifications, a movable unit (movement controller) for separating the magnetic recording medium and the magnetic recording head from each other, or moving the magnetic recording medium and the magnetic recording head relative to each other under a contact state, a position controller for positioning the magnetic recording head at a predetermined recording position of the magnetic recording medium, and a signal processing unit for writing signals to and reading signals from the magnetic recording medium using the magnetic recording head. The recording medium disk 116 can be used as the aforementioned magnetic recording medium. The aforementioned movable unit may include a slider. Furthermore, the aforementioned position controller may include an HSA 122.

When the magnetic disk 116 is rotated, and the actuator arm 140 is caused to pivot by the voice coil motor 124 to load the slider onto the magnetic disk 116, the air bearing surface (ABS) of the slider of which the hard disk head is mounted is held above the surface of the magnetic disk 116 at a predetermined floating distance therefrom. In this manner, the information recorded on the magnetic disk 116 is read based on the aforementioned principle.

The magnetic recording apparatus according to the second embodiment, which uses any of the magnetic recording heads according to the first embodiment and its modifications, is capable of providing a microwave-assisted magnetic recording apparatus suitable for generating a steep gradient magnetic field and Improving the track recording density.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A microwave-assisted magnetic recording head comprising:
   a magnetic pole;
   a magnetic shield including a first portion and a second portion connecting to the first portion, a gap being present between the first portion and the magnetic pole;
   a recording coil disposed to at least one of the magnetic pole and the magnetic shield; and
   a spin torque oscillator including a nonmagnetic intermediate layer extending within and outside the gap, an oscillation layer disposed on a portion of the nonmagnetic intermediate layer in the gap, and a spin injection layer in which a magnetization direction is pinned and which is disposed on a portion of the nonmagnetic intermediate layer outside the gap so as to be separated from the oscillation layer.

2. The recording head according to claim 1, wherein the first portion and the second portion form a magnetic path with the magnetic pole, and the gap serves as a recording gap disconnecting the magnetic path.

3. The recording head according to claim 1, wherein the spin injection layer injects spins to the oscillation layer via the nonmagnetic intermediate layer.

4. The recording head according to claim 1, wherein the spin injection layer includes a first spin injection portion and a second spin injection portion disposed on opposite sides of the nonmagnetic intermediate layer.

5. The head according to claim 4, wherein each of the first spin injection portion and the second spin injection portion includes a magnetic layer, the magnetic layer of the first spin injection portion and the magnetic layer of the second spin injection portion having opposite magnetization directions.

6. The head according to claim 5, wherein one of the first spin injection portion and the second spin injection portion Includes an antiferromagnetic layer, and the magnetization direction of the magnetic layer of the one of the first spin injection portion and the second spin injection portion is pinned by the antiferromagnetic layer.

7. The head according to claim 4, wherein:
the first spin injection portion includes a first magnetic layer disposed on the nonmagnetic intermediate layer, a magnetization direction of the first spin injection portion being pinned; and
the second spin injection portion includes a second magnetic layer disposed on the nonmagnetic intermediate layer, in which a magnetization direction is opposite to the magnetization direction of the first magnetic layer, a third magnetic layer disposed on the second magnetic layer, and an antiferromagnetic coupling layer disposed between the second magnetic layer and the third magnetic layer, and configured for antiferromagnetic coupling of the second magnetic layer and the third magnetic layer.

8. The head according to claim 4, wherein:
the first spin injection portion includes a first magnetic layer disposed on the nonmagnetic intermediate layer, a magnetization direction of the first spin injection portion being pinned; and
the second spin injection portion includes second magnetic layer deposed on the nonmagnetic intermediate layer, in which a magnetization direction is the same as that of the first magnetic layer, and a negative spin torque generating layer disposed between the nonmagnetic intermediate layer and the second magnetic layer.

9. The head according to claim 4, wherein a junction area of the first spin injection portion with the nonmagnetic intermediate layer and a junction area of the second spin injection portion with the nonmagnetic intermediate layer are each greater than a junction area of the oscillation layer with the nonmagnetic intermediate layer.

10. A magnetic recording apparatus comprising:
the microwave-assisted magnetic recording head according to claim 4; and
a current drive and control circuit that causes a first drive current to flow through the recording coil, the first drive current being capable of switching a polarity, and a second drive current that is in synchronization with the first drive current to flow between the first spin injection portion and the second spin injection portion.

11. The apparatus according to claim 10, further comprising:
a magnetic recording medium:
a movement controller that controls movements of the magnetic recording medium and the microwave-assisted magnetic recording head so that they face each other and move relative to each other in a floating state or contacting state;
a position controller that controls a position of the microwave-assisted magnetic recording head to be at a predetermined recording position of the magnetic recording medium; and
a signal processing unit that processes a write signal to the magnetic recording medium using the microwave-assisted magnetic recording head.

12. The apparatus according to claim 11, wherein:
the microwave-assisted magnetic recording head further includes a reproduction unit that reproduces information written to the magnetic recording medium; and
the signal processing unit also processes signals reproduced by the reproduction unit.

13. The head according to claim 1, wherein the spin injection layer includes a first spin injection portion and a second spin injection portion, each disposed on one side of the nonmagnetic intermediate layer so as to be separated from each other.

14. The head according to claim 1, wherein a film that increases an interface resistance is disposed to at least one of an interface between the oscillation layer and the nonmagnetic intermediate layer and an interface between the spin injection layer and the nonmagnetic intermediate layer in the gap.

15. The head according to claim 14, wherein the magnetic path is not disconnected except for the gap.

16. The head according to claim 1, wherein the gap is inclined relative to a direction from the magnetic pole to the magnetic shield.

17. The head according to claim 1, wherein a metal layer connects the oscillation layer and the magnetic pole, or the oscillation layer and the magnetic shield.

18. A magnetic recording apparatus comprising:
the microwave-assisted magnetic recording head according to claim 17; and
a current drive and control circuit that causes a first drive current to flow through the recording coil, the first drive current being capable of switching a polarity, and a second drive current that is in synchronization with the first drive current to flow between the oscillation layer and the spin injection layer.

* * * * *